(12) United States Patent
Tanaka

(10) Patent No.: US 12,738,109 B2
(45) Date of Patent: Sep. 15, 2026

(54) DETERMINATION OF A FAILURE OF A SIGNAL LINE OR A FAILURE OF A WIRE FOR SUPPLYING ELECTRIC POWER

(71) Applicant: HONDA MOTOR CO., LTD., Tokyo (JP)

(72) Inventor: Masaki Tanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 488 days.

(21) Appl. No.: 17/683,387

(22) Filed: Mar. 1, 2022

(65) Prior Publication Data

US 2022/0309847 A1 Sep. 29, 2022

(30) Foreign Application Priority Data

Mar. 26, 2021 (JP) ................................ 2021-052597

(51) Int. Cl.

*G07C 5/08* (2006.01)
*B60W 20/20* (2016.01)
*B60W 40/105* (2012.01)

(52) U.S. Cl.

CPC ........... *G07C 5/0816* (2013.01); *B60W 20/20* (2013.01); *B60W 40/105* (2013.01); *B60W 2510/081* (2013.01)

(58) Field of Classification Search

CPC ....... B60K 6/442; B60L 3/003; B60L 3/0061; B60L 3/0092; B60L 15/06; B60L 15/08;

(Continued)

(56) References Cited

U.S. PATENT DOCUMENTS

2009/0237013 A1* 9/2009 Sato ........................ B60L 15/08 318/400.15
2011/0022261 A1* 1/2011 Pushkolli ............ G01R 31/007 701/31.4

(Continued)

FOREIGN PATENT DOCUMENTS

JP 2005-147672 6/2005
JP 2013-192399 9/2013

(Continued)

OTHER PUBLICATIONS

Japanese Office Action for Japanese Patent Application No. 2021-052597 mailed Jun. 25, 2024.

*Primary Examiner* — Angela Y Ortiz
*Assistant Examiner* — Aaron K McCullers
(74) *Attorney, Agent, or Firm* — Amin, Turocy & Watson, LLP

(57) ABSTRACT

Provided is a failure determination device that includes a storage medium that stores a command readable by a computer and a processor. The processor executes the command to acquire rotation angle data, voltage phase data, angular velocity data, direct-current voltage data, and current data. The processor also executes the command to generate current expectation value data indicating an expectation value of the current supplied to the rotating electrical machine and to determine, in a case where the inverter is controlled by one-pulse control, whether at least one of a signal line connected to a switching element and a conducting wire for supplying electric power to the rotating electrical machine has failed based on the current expectation value data and the current data.

4 Claims, 7 Drawing Sheets

(58) Field of Classification Search

CPC ......... B60L 2240/421; B60L 2240/427; B60L 2240/429; B60W 20/20; B60W 40/105; B60W 2510/081; B60W 2510/085; B60W 2510/086; G01M 15/00; G01M 15/042; G01M 15/044; G01M 15/046; G01M 17/00; G01R 31/005; G01R 31/006; G01R 31/08; G01R 31/11; G07C 5/0808; G07C 5/0816

USPC ......... 701/29.1, 31.4, 31.7, 31.9, 32.8, 33.1, 701/33.5, 33.7, 33.8, 33.9, 34.3, 34.4

See application file for complete search history.

(56) References Cited

U.S. PATENT DOCUMENTS

| | | | | |
|---|---|---|---|---|
| 2014/0054103 | A1* | 2/2014 | Kezobo | G01R 31/343<br>180/446 |
| 2015/0061557 | A1 | 3/2015 | Shouji | |
| 2015/0123581 | A1* | 5/2015 | Omata | H02P 29/032<br>318/400.17 |
| 2017/0272024 | A1* | 9/2017 | Mastrocola | G01R 31/42 |
| 2020/0180438 | A1* | 6/2020 | Shin | B60L 3/12 |
| 2020/0300671 | A1* | 9/2020 | Mori | G01D 5/20 |

FOREIGN PATENT DOCUMENTS

| | | |
|---|---|---|
| JP | 2015-033300 | 2/2015 |
| JP | 2020-137217 | 8/2020 |

* cited by examiner

FIG. 2

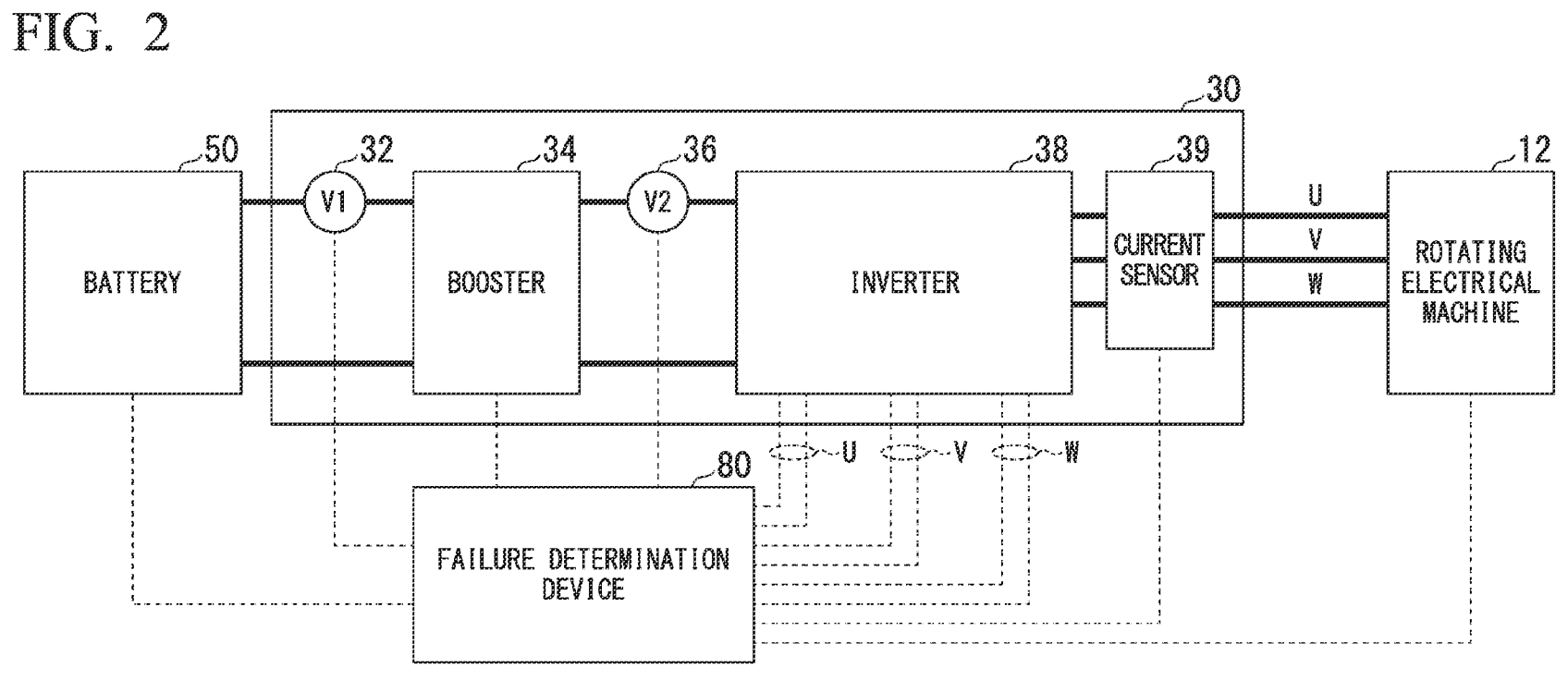

12 ROTATING ELECTRICAL MACHINE
U V W
30
39 CURRENT SENSOR
38 INVERTER
W V U
36 V2
34 BOOSTER
32 V1
50 BATTERY
80 FAILURE DETERMINATION DEVICE

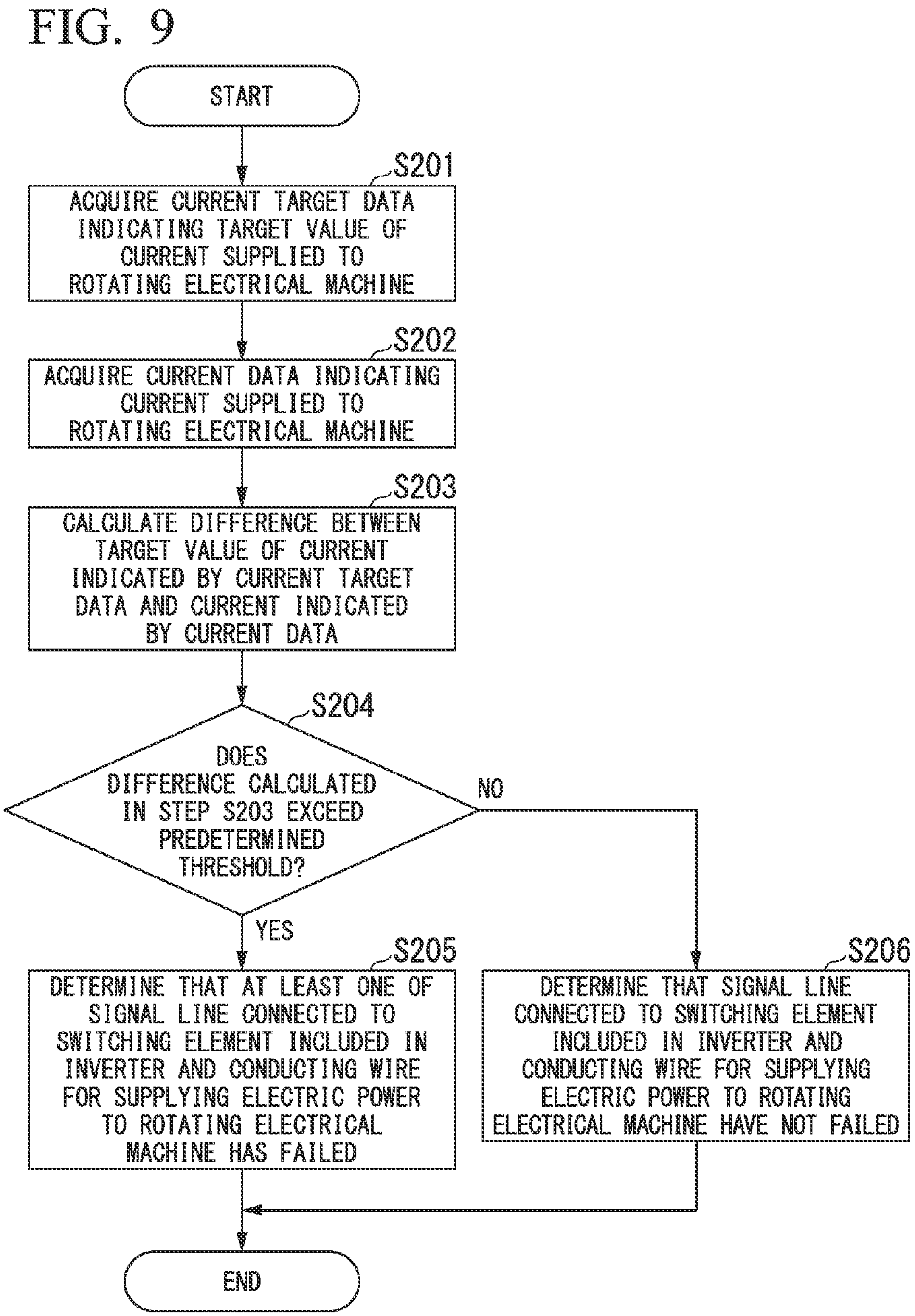
FIG. 9
START
S201
ACQUIRE CURRENT TARGET DATA INDICATING TARGET VALUE OF CURRENT SUPPLIED TO ROTATING ELECTRICAL MACHINE
S202
ACQUIRE CURRENT DATA INDICATING CURRENT SUPPLIED TO ROTATING ELECTRICAL MACHINE
S203
CALCULATE DIFFERENCE BETWEEN TARGET VALUE OF CURRENT INDICATED BY CURRENT TARGET DATA AND CURRENT INDICATED BY CURRENT DATA
S204
DOES DIFFERENCE CALCULATED IN STEP S203 EXCEED PREDETERMINED THRESHOLD?
NO
YES
S205
DETERMINE THAT AT LEAST ONE OF SIGNAL LINE CONNECTED TO SWITCHING ELEMENT INCLUDED IN INVERTER AND CONDUCTING WIRE FOR SUPPLYING ELECTRIC POWER TO ROTATING ELECTRICAL MACHINE HAS FAILED
S206
DETERMINE THAT SIGNAL LINE CONNECTED TO SWITCHING ELEMENT INCLUDED IN INVERTER AND CONDUCTING WIRE FOR SUPPLYING ELECTRIC POWER TO ROTATING ELECTRICAL MACHINE HAVE NOT FAILED
END

DETERMINATION OF A FAILURE OF A SIGNAL LINE OR A FAILURE OF A WIRE FOR SUPPLYING ELECTRIC POWER

CROSS-REFERENCE TO RELATED APPLICATION

Priority is claimed on Japanese Patent Application No. 2021-052597, filed Mar. 26, 2021, the content of which is incorporated herein by reference.

BACKGROUND

Field of the Invention

The present invention relates to a failure determination device, a storage medium, and a failure determination method.

Description of Related Art

Since the past, vehicles powered by a rotating electrical machine used as an electric motor, for example, an electric vehicle (EV), a hybrid vehicle (HV), and a fuel cell vehicle (FCV), have been developed. A rotating electrical machine mounted in these vehicles is driven by, for example, alternating-current power which is supplied from an inverter controlled by pulse width modulation (PWM) control or one-pulse control.

In addition, in vehicles having the rotating electrical machine mounted therein, it is necessary to determine whether at least one of a signal line connected to a switching element included in an inverter and a conducting wire for supplying electric power to the rotating electrical machine has failed. Examples of a technique of executing such a determination include a disconnection detection device disclosed in Japanese Unexamined Patent Application, First Publication No. 2005-147672.

The disconnection detection device includes an absolute value calculation unit and a disconnection determination unit. The absolute value calculation unit detects the absolute value of a deviation between a Q-axis current command and a Q-axis current output in vector control. The disconnection determination unit determines that at least one phase of an inverter output is disconnected or has poor contact when the absolute value of the deviation becomes a predetermined value or more and this state continues a set number of times or more within a certain period of time.

SUMMARY

However, since a Q-axis current command is not generated in a case where the inverter is controlled by one-pulse control, the above-described disconnection detection device cannot execute a process of detecting disconnection and poor contact. That is, the above-described disconnection detection device reduces opportunities to determine whether at least one of a signal line connected to a switching element included in the inverter and a conducting wire for supplying electric power to the rotating electrical machine has failed.

The present invention was contrived in view of such circumstances, and one object thereof is to provide a failure determination device, a storage medium, and a failure determination method for not reducing opportunities to determine whether at least one of the signal line connected to the switching element included in the inverter and the conducting wire for supplying electric power to the rotating electrical machine has failed.

The following configurations are adopted in a failure determination device, a storage medium, and a failure determination method according to this invention.

(1) According to an aspect of this invention, there is provided a failure determination device including: a storage medium that stores a command capable of being read by a computer; and a processor connected to the storage medium, wherein the processor executes the command capable of being read by the computer, to thereby acquire rotation angle data indicating a rotation angle of a rotor included in a rotating electrical machine, voltage phase data indicating a phase of a voltage applied to the rotating electrical machine, angular velocity data indicating an angular velocity of the rotor, direct-current voltage data indicating a direct-current voltage supplied to an inverter that supplies electric power to the rotating electrical machine, and current data indicating a current supplied to the rotating electrical machine, calculate an expectation value of the current supplied to the rotating electrical machine using the rotation angle data, the voltage phase data, the angular velocity data, and the direct-current voltage data and generate current expectation value data indicating the expectation value, and determine, in a case where the inverter is controlled by one-pulse control, whether at least one of a signal line connected to a switching element included in the inverter and a conducting wire for supplying electric power to the rotating electrical machine has failed on the basis of the current expectation value data and the current data.

(2) In the aspect of the above (1), the processor determines that at least one of the signal line and the conducting wire has failed in a case where a difference between the expectation value of the current indicated by the current expectation value data and the current indicated by the current data exceeds a predetermined threshold.

(3) In the aspect of the above (1), the processor further acquires current target data indicating a target value of the current supplied to the rotating electrical machine, and in a case where the inverter is controlled by pulse width modulation control, the processor determines whether at least one of the signal line and the conducting wire has failed on the basis of the current target data and the current data.

(4) According to an aspect of this invention, there is provided a computer readable non-transitory storage medium having a failure determination program stored therein, the program causing a computer to realize: a data acquisition function of acquiring rotation angle data indicating a rotation angle of a rotor included in a rotating electrical machine, voltage phase data indicating a phase of a voltage applied to the rotating electrical machine, angular velocity data indicating an angular velocity of the rotor, direct-current voltage data indicating a direct-current voltage supplied to an inverter that supplies electric power to the rotating electrical machine, and current data indicating a current supplied to the rotating electrical machine; a current expectation value calculation function of calculating an expectation value of the current supplied to the rotating electrical machine using the rotation angle data, the voltage phase data, the angular velocity data, and the direct-current voltage data and generating current expectation value data indicating the expectation value; and a failure determination function of determining, in a case where the inverter is controlled by one-pulse control, whether at least one of a signal line connected to a switching element included in the inverter and a conducting wire for supplying electric power to the rotating electrical machine has failed on the basis of the current expectation value data and the current data.

(5) According to an aspect of this invention, there is provided a failure determination method including causing a computer to: use a data acquisition function to acquire rotation angle data indicating a rotation angle of a rotor included in a rotating electrical machine, voltage phase data indicating a phase of a voltage applied to the rotating electrical machine, angular velocity data indicating an angular velocity of the rotor, direct-current voltage data indicating a direct-current voltage supplied to an inverter that supplies electric power to the rotating electrical machine, and current data indicating a current supplied to the rotating electrical machine; use a current expectation value calculation function to calculate an expectation value of the current supplied to the rotating electrical machine using the rotation angle data, the voltage phase data, the angular velocity data, and the direct-current voltage data and calculate current expectation value data indicating the expectation value; and use a failure determination function to determine, in a case where the inverter is controlled by one-pulse control, whether at least one of a signal line connected to a switching element included in the inverter and a conducting wire for supplying electric power to the rotating electrical machine has failed on the basis of the current expectation value data and the current data.

According to (1) to (3), even in a case where the inverter is controlled by the one-pulse control and the current target data indicating the target value of the current supplied to the rotating electrical machine is not generated, the failure determination device can determine whether at least one of the signal line connected to the switching element included in the inverter and the conducting wire for supplying electric power to the rotating electrical machine has failed. Therefore, the failure determination device does not reduce opportunities to execute such a determination.

According to (3), in a case where the inverter is controlled by pulse width modulation control and the current target data indicating the target value of the current supplied to the rotating electrical machine is not generated, the failure determination device can determine whether at least one of the signal line and the conducting wire described above has failed on the basis of the current target data and the current data.

BRIEF DESCRIPTION OF THE DRAWINGS

FIG. 2 is a diagram illustrating an example of a first PDU according to the embodiment and a configuration around the first PDU.

FIG. 9 is a flowchart illustrating an example of processing which is executed by the failure determination device according to the embodiment in a case where pulse width modulation control is executed.

DESCRIPTION OF EMBODIMENTS

Hereinafter, an embodiment of a failure determination device, a failure determination program, and a failure determination method according to the present invention will be described with reference to the accompanying drawings.

Embodiment

Figure 1:
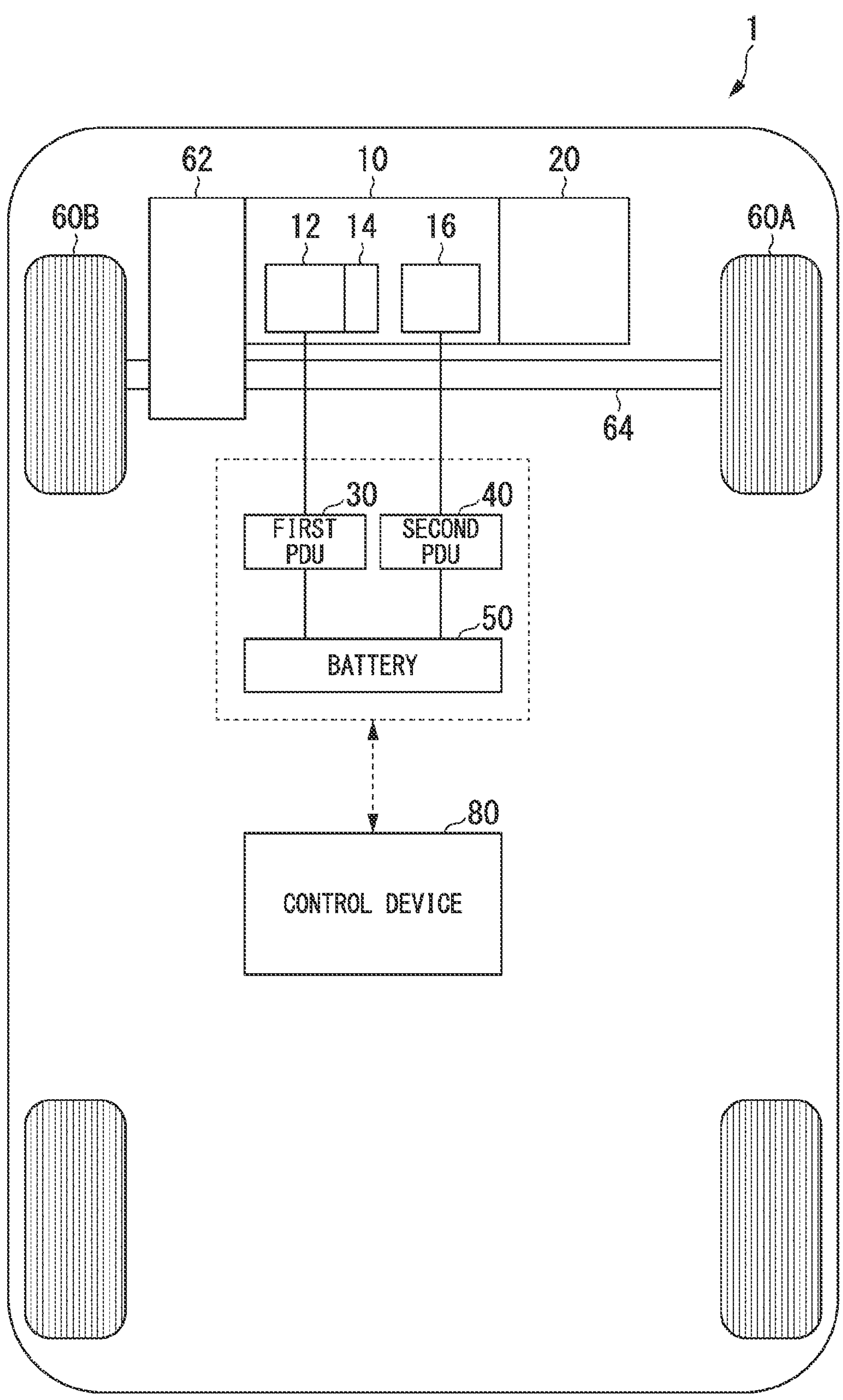
FIG. 1 is a diagram illustrating an example of a vehicle according to an embodiment.

First, a vehicle according to an embodiment will be described with reference to FIGS. 1 to 6. FIG. 1 is a diagram illustrating an example of a vehicle according to an embodiment. As shown in FIG. 1, a vehicle 1 includes, for example, a rotating electrical machine generator 10, an engine 20, a first power drive unit (PDU) 30, a second PDU 40, a battery 50, a driving wheel 60A, a driving wheel 60B, a transmission 62, an axle 64, and a failure determination device 80.

The rotating electrical machine generator 10 includes a rotating electrical machine 12, a rotation angle sensor 14, and a generator 16.

The rotating electrical machine 12 includes a rotor and a stator, and functions as an electric motor that supplies motive power to the vehicle 1. For example, the rotating electrical machine 12 is a three-phase synchronous electric motor which is driven by an alternating current supplied from at least one of the first PDU 30 and the generator 16. The motive power generated by the rotating electrical machine 12 is transferred to the axle 64 to which the driving wheel 60A and the driving wheel 60B are attached through the transmission 62.

In addition, a d axis and a q axis are defined in the rotating electrical machine 12. The d axis is a field direction of a permanent magnet installed in the rotor, that is, an axis which is orthogonal to the rotation axis of the rotor and in a direction from the S pole of the rotor toward the N pole thereof. The q axis is an axis obtained by electrically and magnetically rotating the d axis 90 degrees in a direction in which the rotor rotates. That is, the d axis and the q axis are coordinate axes of synchronous rotating coordinates of the rotor and rotate together with the rotor. The rotating electrical machine 12 is controlled by, for example, vector control.

The rotation angle sensor 14 is attached to the rotating electrical machine 12 at a predetermined attachment angle, and measures the rotation angle of the rotor included in the rotating electrical machine 12. The generator 16 generates electric power by rotating in response to the motive power generated by the engine 20. The electric power generated by the generator 16 is supplied to the battery 50 through the second PDU 40. Meanwhile, the generator 16 may be omitted. In this case, instead of the generator 16, the rotating electrical machine 12 generates electric power and supplies the electric power to the battery 50.

The engine 20 supplies motive power to the vehicle 1. The motive power generated by the engine 20 is transferred to the axle 64 through the transmission 62. Alternatively, the motive power generated by the engine 20 is transferred to the generator 16.

Next, the first PDU according to the embodiment and the configuration around the first PDU will be described with reference to FIG. 2. FIG. 2 is a diagram illustrating an example of the first PDU according to the embodiment and the configuration around the first PDU. As shown in FIG. 2, the first PDU 30 includes a first voltage sensor 32, a booster 34, a second voltage sensor 36, an inverter 38, and a current sensor 39.

The first voltage sensor 32 is connected between the battery 50 and the booster 34, and measures a voltage of direct-current power which is input to the booster 34. The booster 34 amplifies the voltage and supplies the amplified voltage to the inverter 38. The second voltage sensor 36 measures the direct-current voltage amplified by the booster 34. The inverter 38 converts the direct-current power supplied from the booster 34 into alternating-current power and supplies it to the rotating electrical machine 12. The current sensor 39 detects a current of each of a U phase, a V phase, and a W phase which is supplied to the rotating electrical machine 12.

Next, the control system of the inverter according to the embodiment will be described with reference to FIGS. 3 to 5. Examples of the control system of the inverter 38 include pulse width modulation control and one-pulse control. The pulse width modulation control is, for example, sinusoidal pulse width modulation control or overmodulation pulse width modulation control. The sinusoidal pulse width modulation control, the overmodulation pulse width modulation control, and the one-pulse control are all control for switching between the electrical conduction state and non-electrical conduction state of a switching element included in the inverter 38.

Figure 3:
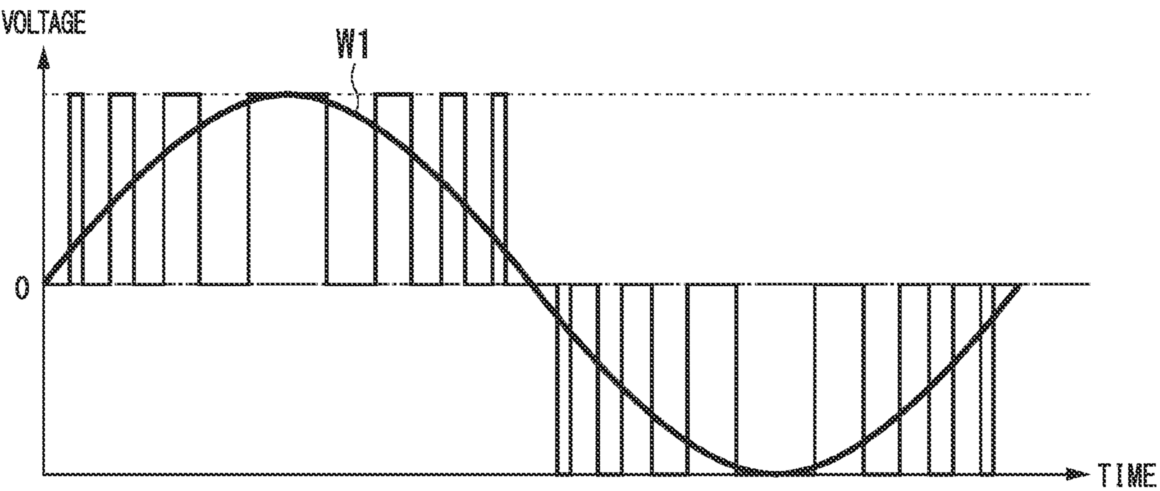
FIG. 3 is a diagram illustrating an example of a waveform of a voltage which is output by an inverter according to the embodiment in a case where sinusoidal pulse width modulation control is executed.

FIG. 3 is a diagram illustrating an example of a waveform of a voltage which is output by the inverter according to the embodiment in a case where the sinusoidal pulse width modulation control is executed. In FIG. 3, the vertical axis represents voltage, and the horizontal axis represents time.

The sinusoidal pulse width modulation control is a control system in which an alternating-current voltage equivalent to an alternating-current voltage represented by a sinusoidal wave W1 shown in FIG. 3 is supplied to the rotating electrical machine 12 by adjusting the duty ratio of a voltage pulse. In addition, in the sinusoidal pulse width modulation control, the amplitude and phase of the alternating-current voltage are controlled by performing feedback control on an alternating current which is supplied to the rotating electrical machine 12. Further, in the sinusoidal pulse width modulation control, the linearity between a voltage and a pulse width modulation control signal is maintained by executing pulse width modulation in a state where the amplitude of the alternating-current voltage represented by the sinusoidal wave W1 is equal to or less than the amplitude of a voltage which is applied to the inter-line of the rotating electrical machine 12. In addition, the sinusoidal pulse width modulation control is control for maintaining the linearity. Therefore, in the sinusoidal pulse width modulation control, the number of times switching between the electrical conduction state and non-electrical conduction state of a switching element included in the inverter 38 is executed is larger than that in the overmodulation pulse width modulation control and the one-pulse control.

Figure 4:
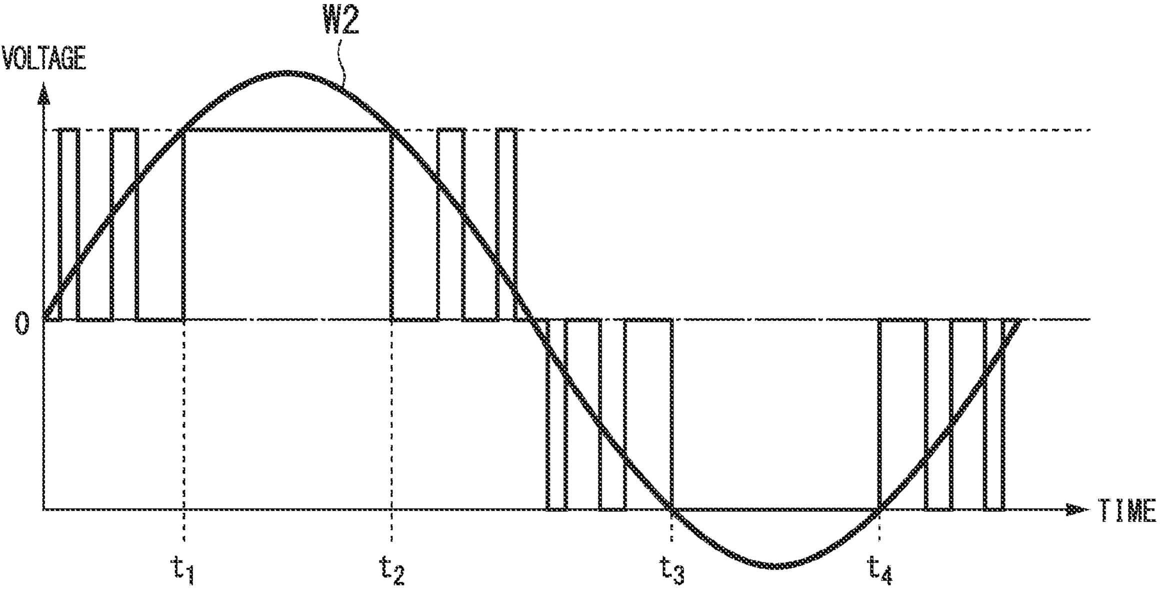
FIG. 4 is a diagram illustrating an example of a waveform of a voltage which is output by the inverter according to the embodiment in a case where overmodulation pulse width modulation control is executed.

FIG. 4 is a diagram illustrating an example of a waveform of a voltage which is output by the inverter according to the embodiment in a case where the overmodulation pulse width modulation control is executed. In FIG. 4, the vertical axis represents voltage, and the horizontal axis represents time.

In the overmodulation pulse width modulation control, the amplitude and phase of the alternating-current voltage are controlled by performing feedback control on an alternating current which is supplied to the rotating electrical machine 12. In addition, in the overmodulation pulse width modulation control, the non-linearity between a voltage and a pulse width modulation signal is allowed by executing pulse width modulation in a state where the amplitude of an alternating-current voltage represented by a sinusoidal wave W2 shown in FIG. 4 is larger than the amplitude of a voltage which is applied to the inter-line of the rotating electrical machine 12. Thereby, the overmodulation pulse width modulation control distorts the inter-line voltage of the rotating electrical machine 12 which is a pseudo-sinusoidal wave so as to approach a rectangular wave, and makes it possible to increase a voltage utilization rate more than in a case where the inter-line voltage is a pseudo-sinusoidal wave.

As shown in FIG. 4, in the non-linear period from time t1 to time t2 and the non-linear period from time t3 to time t4, the absolute value of the voltage represented by the sinusoidal wave W2 is larger than the absolute value of a voltage which is actually applied. That is, in these two non-linear periods, the inter-line voltage of the rotating electrical machine 12 approaches a rectangular wave shape from a sinusoidal shape, and the voltage utilization rate increases. In addition, the overmodulation pulse width modulation control is control in which the linearity between a voltage and a pulse width modulation control signal is not maintained. Therefore, in overmodulation pulse width modulation control, the number of times switching is executed is smaller than that in the sinusoidal pulse width modulation control.

Figure 5:
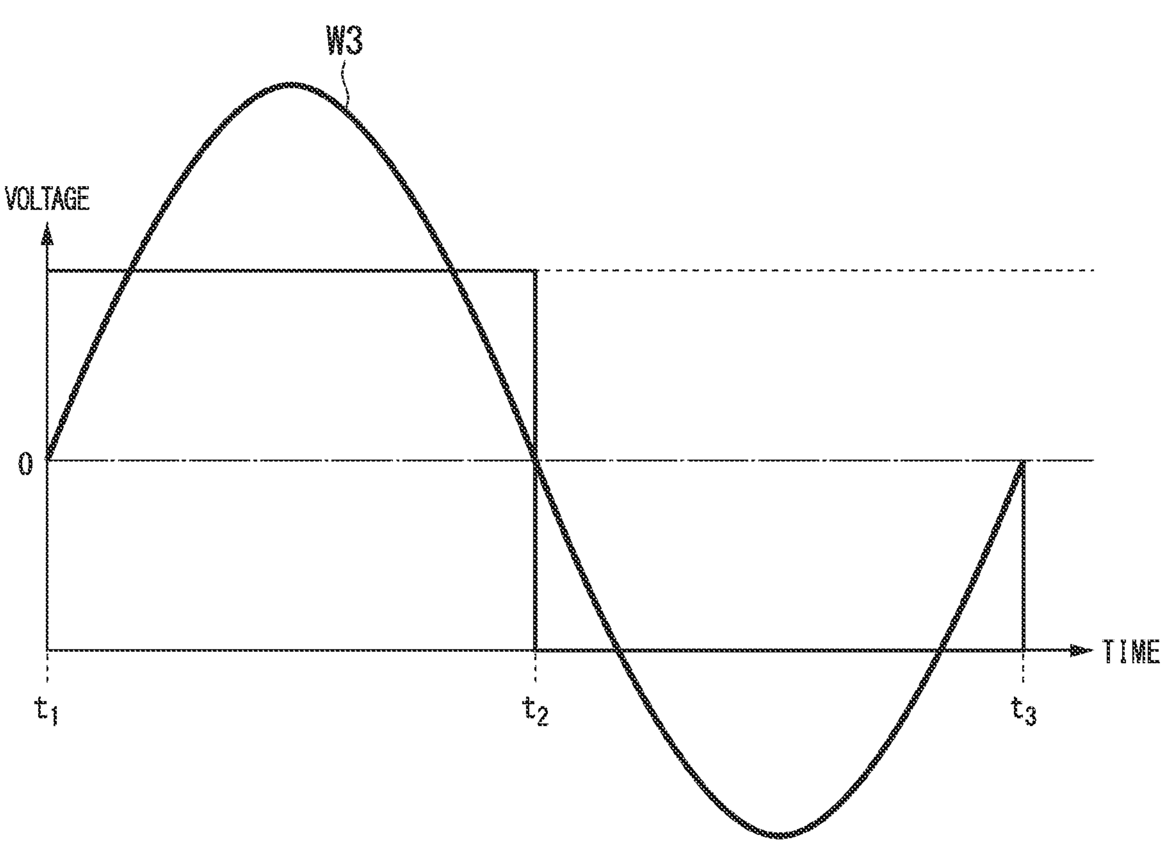
FIG. 5 is a diagram illustrating an example of a waveform of a voltage which is output by the inverter according to the embodiment in a case where one-pulse control is executed.

FIG. 5 is a diagram illustrating an example of a waveform of a voltage which is output by the inverter according to the embodiment in a case where the one-pulse control is executed. In FIG. 5, the vertical axis represents voltage, and the horizontal axis represents time.

In the one-pulse control, switching is executed twice for each period. For example, as shown in FIG. 5, in the period from time t1 to time t3 which is equal to the period of a sinusoidal wave W3, switching is executed at two points in time, that is, time t1 and time t2. Thereby, in the one-pulse control, the amplitude and phase of the alternating-current voltage is controlled by performing feedback control on the alternating-current voltage which is supplied to the rotating electrical machine 12. In addition, when FIGS. 4 and 5 are compared with each other, it can be understood that the one-pulse control makes it possible to increase the voltage utilization rate more than in the overmodulation pulse width modulation control. Further, in the one-pulse control, the number of times switching is executed is smaller than that in the overmodulation pulse width modulation control.

Meanwhile, in a case where the control system of the inverter 38 is pulse width modulation control, current vector control is adopted as a system of controlling the torque of the rotating electrical machine 12. In a case where the current vector control is adopted, current target data to be described later is generated. On the other hand, in a case where the control system of the inverter 38 is one-pulse control, voltage phase control is adopted as a system of controlling the torque of the rotating electrical machine 12. In a case where the voltage phase control is adopted, current target data to be described later is not generated.

Figure 6:
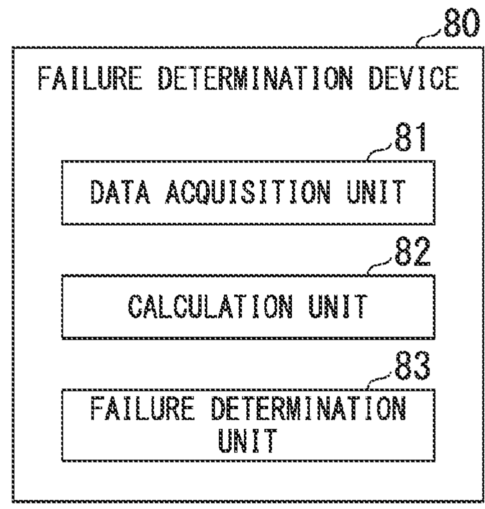
FIG. 6 is a diagram illustrating an example of a software configuration of a failure determination device according to the embodiment.

Next, the failure determination device according to the embodiment will be described with reference to FIG. 6. FIG. 6 is a diagram illustrating an example of a software configuration of the failure determination device according to the embodiment. As shown in FIG. 6, the failure determination device 80 includes a data acquisition unit 81, a calculation unit 82, and a failure determination unit 83.

At least a portion of functions of the failure determination device 80 is realized by, for example, executing a control program in which a hardware processor such as a central processing unit (CPU) is realized as software. At least some of these components may be realized by hardware (a circuit unit; including circuitry) such as a large scale integration (LSI), an application specific integrated circuit (ASIC), a field-programmable gate array (FPGA), or a graphics processing unit (GPU), or may be realized by software and hardware in cooperation.

In a case where the inverter 38 is controlled by the one-pulse control, the data acquisition unit 81 acquires rotation angle data, voltage phase data, angular velocity data, and direct-current voltage data. The rotation angle data is data indicating the rotation angle of the rotor included in the rotating electrical machine 12, and is generated by the rotation angle sensor 14 measuring the rotation angle of the rotor. The voltage phase data is data indicating the phase of a voltage which is applied to the rotating electrical machine 12. In addition, since the phase of the voltage which is applied to the rotating electrical machine 12 has a correlation with a torque required for the rotating electrical machine 12, the voltage phase data indicates a phase having a correlation with the torque. The angular velocity data is data indicating the angular velocity of the rotor, and is generated by the rotation angle sensor 14 measuring the angular velocity of the rotor. The direct-current voltage data is data indicating a direct-current voltage which is supplied to the inverter 38 that supplies electric power to the rotating electrical machine 12, and is generated by the second voltage sensor 36 measuring the direct-current voltage which is supplied to the inverter 38.

In addition, in a case where the inverter 38 is controlled by the pulse width modulation control, the data acquisition unit 81 acquires current target data. The current target data is, for example, data indicating a target value of the current of each phase of a three-phase alternating current which is supplied to the rotating electrical machine 12 at a predetermined time.

In addition, the data acquisition unit 81 acquires current data indicating a current which is supplied to the rotating electrical machine 12. The current data is, for example, data indicating the current of each phase of the three-phase alternating current which is supplied to the rotating electrical machine 12 at a predetermined time.

In a case where the inverter 38 is controlled by the one-pulse control, the calculation unit 82 calculates the expectation value of the current which is supplied to the rotating electrical machine 12 using the rotation angle data, the voltage phase data, the angular velocity data, and the direct-current voltage data, and generates current expectation value data indicating the expectation value. For example, the calculation unit 82 calculates the expectation value of the current of each phase of the three-phase alternating current which is supplied to the rotating electrical machine 12 at a predetermined time using the following method.

First, the calculation unit 82 calculates the component vd of a voltage which is applied to the rotating electrical machine 12 in a d-axis direction and the component vq of the voltage in a q-axis direction using a direct-current voltage obtained by multiplying the rotation angle θ of the rotor indicated by the rotation angle data, the phase δ of the voltage indicated by the voltage phase data, and a direct-current voltage indicated by the direct-current voltage data by $\sqrt{6}/\pi$.

Next, the calculation unit 82 calculates the expectation value id of the component of a current flowing through the rotating electrical machine 12 in the d-axis direction and the expectation value iq of the component of the current in the q-axis direction by simultaneously solving the following Expressions (1) and (2) which are established with respect to an electric motor controlled by vector control. Expression (1) includes the electrical resistance r of the winding of the stator, the angular velocity ω indicated by the angular velocity data, and the component Lq of the inductance of the rotating electrical machine 12 in the q-axis direction. Expression (2) includes the electrical resistance r of the winding of the stator, the angular velocity ω indicated by the angular velocity data, the component Ld of the inductance of the rotating electrical machine 12 in the d-axis direction, and the amount of field magnetic flux Ke of a permanent magnet forming the stator or a permanent magnet forming the rotor.

[Expression 1]

$$v_d = r\, i_d - \omega L_q i_q \tag{1}$$

[Expression 2]

$$v_q = r\, i_q + \omega L_d i_d + \omega K_e \tag{2}$$

The calculation unit 82 calculates the expectation value ix of the current of each phase of the three-phase alternating current which is supplied to the rotating electrical machine 12 at a predetermined time using the expectation value id of the component of the current flowing through the rotating electrical machine 12 in the d-axis direction and the expectation value iq of the component of the current in the q-axis direction. Meanwhile, the subscript x of the expectation value ix of the current of each phase of the three-phase alternating current which is supplied to the rotating electrical machine 12 indicates the U phase, V phase, or W phase of the three-phase alternating current. Here, the calculation unit 82 calculates the expectation value iU of the U-phase current at a predetermined time, the expectation value iV of the V-phase current at a predetermined time, and the expectation value iW of the W-phase current at a predetermined time.

Meanwhile, in a case where the inverter 38 is controlled by the pulse width modulation control, the calculation unit 82 does not execute a process of calculating the expectation value of the current which is supplied to the rotating electrical machine 12 and generating the current expectation value data indicating the expectation value.

In a case where the inverter 38 is controlled by the one-pulse control, the failure determination unit 83 determines whether at least one of a signal line connected to the switching element included in the inverter 38 and a conducting wire for supplying electric power to the rotating electrical machine 12 has failed on the basis of the current expectation value data and the current data. For example, the failure determination unit 83 executes the determination using the following method.

First, the failure determination unit 83 calculates a difference between the expectation value of the current indicated by the current expectation value data at a predetermined time and the current indicated by the current data at a predetermined time for each of the U phase, the V phase, and the W phase. Next, the failure determination unit 83 selects a phase in which the absolute value becomes maximum among these three differences from the U phase, the V phase, and the W phase.

In a case where the maximum difference among the U phase, the V phase, and the W phase exceeds a predetermined threshold, the failure determination unit 83 determines that at least one of the signal line connected to the switching element included in the inverter 38 and the conducting wire for supplying electric power to the rotating electrical machine 12 has failed. On the other hand, in a case where the difference is equal to or less than a predetermined threshold, the failure determination unit 83 determines that the signal line connected to the switching element included in the inverter 38 and the conducting wire for supplying electric power to the rotating electrical machine 12 have not failed. Since the sum of the U-phase current, the V-phase current, and the W-phase current is zero at all times, the failure determination unit 83 can determine whether at least one of the signal line and the conducting wire described above has failed by executing the above-described determination on the basis of the maximum difference among the U phase, the V phase, and the W phase.

In addition, in a case where the inverter 38 is controlled by the pulse width modulation control, the failure determination unit 83 determines whether at least one of the signal line connected to the switching element included in the inverter 38 and the conducting wire for supplying electric power to the rotating electrical machine 12 has failed on the basis of the current target data and the current data. Specifically, the failure determination unit 83 executes the determination using the following method.

First, the failure determination unit 83 calculates a difference between the target value of the current indicated by the current target data and the current indicated by the current data. In a case where the difference exceeds a predetermined threshold, the failure determination unit 83 determines that at least one of the signal line connected to the switching element included in the inverter 38 and the conducting wire for supplying electric power to the rotating electrical machine 12 has failed. On the other hand, in a case where the difference is equal to or less than a predetermined threshold, the failure determination unit 83 determines that the signal line connected to the switching element included in the inverter 38 and the conducting wire for supplying electric power to the rotating electrical machine 12 have not failed.

Figure 7:
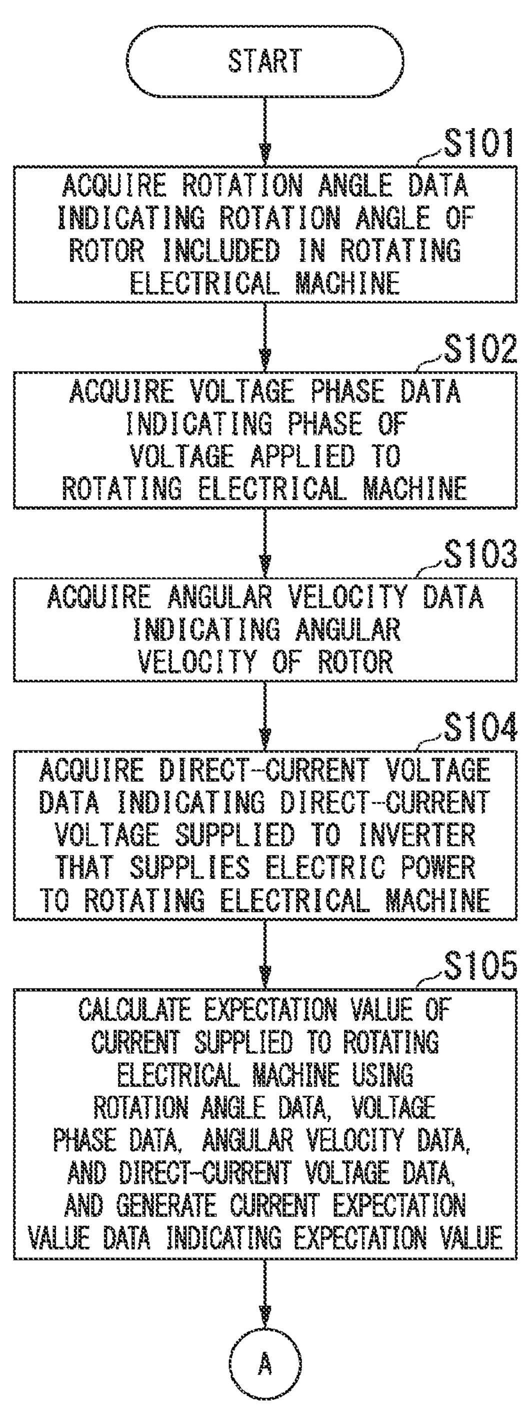
FIG. 7 is a flowchart illustrating an example of processing which is executed by the failure determination device according to the embodiment in a case where one-pulse control is executed.
Figure 8:
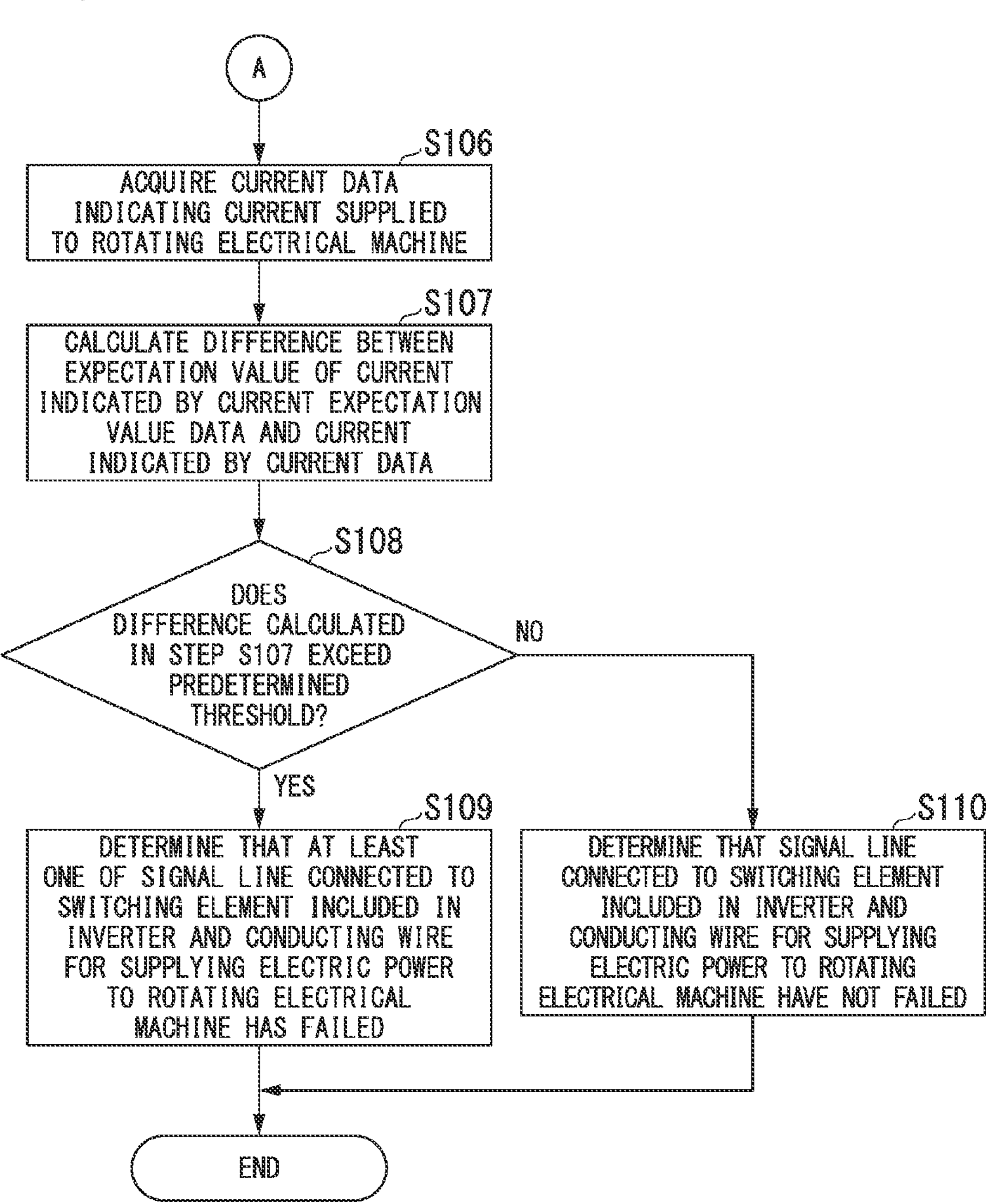
FIG. 8 is a flowchart illustrating an example of processing which is executed by the failure determination device according to the embodiment in a case where one-pulse control is executed.

Next, reference will be made to FIGS. 7 and 8 to describe processing which is executed by the failure determination device 80 according to the embodiment in a case where the one-pulse control is executed. FIGS. 7 and 8 are flowcharts illustrating an example of processing which is executed by the failure determination device according to the embodiment in a case where the one-pulse control is executed. Meanwhile, the flowchart shown in FIG. 7 and the flowchart shown in FIG. 8 are connected to each other by a connector A. In addition, processing shown in FIGS. 7 and 8 can be executed regardless of the phase of the voltage phase control which is executed simultaneously with the one-pulse control.

In step S101, the data acquisition unit 81 acquires rotation angle data indicating the rotation angle of the rotor included in the rotating electrical machine 12.

In step S102, the data acquisition unit 81 acquires voltage phase data indicating the phase of a voltage which is applied to the rotating electrical machine 12.

In step S103, the data acquisition unit 81 acquires angular velocity data indicating the angular velocity of the rotor.

In step S104, the data acquisition unit 81 acquires direct-current voltage data indicating a direct-current voltage which is supplied to the inverter 38 that supplies electric power to the rotating electrical machine 12.

In step S105, the calculation unit 82 calculates the expectation value of the current which is supplied to the rotating electrical machine 12 using the rotation angle data, the voltage phase data, the angular velocity data, and the direct-current voltage data, and generates current expectation value data indicating the expectation value.

In step S106, the data acquisition unit 81 acquires current data indicating the current which is supplied to the rotating electrical machine 12.

In step S107, the failure determination unit 83 calculates a difference between the expectation value of the current indicated by the current expectation value data and the current indicated by the current data.

In step S108, the failure determination unit 83 determines whether the difference calculated in step S107 exceeds a predetermined threshold. In a case where the failure determination unit 83 determines that the difference calculated in step S107 exceeds the predetermined threshold (step S108: YES), the failure determination unit advances the process to step S109. On the other hand, in a case where the failure determination unit 83 determines that the difference calculated in step S107 is equal to or less than the predetermined threshold (step S108: NO), the failure determination unit advances the process to step S110.

In step S109, the failure determination unit 83 determines that at least one of the signal line connected to the switching element included in the inverter 38 and the conducting wire for supplying electric power to the rotating electrical machine 12 has failed.

In step S110, the failure determination unit 83 determines that the signal line connected to the switching element included in the inverter 38 and the conducting wire for supplying electric power to the rotating electrical machine 12 have not failed.

Next, reference will be made to FIG. 9 to describe processing which is executed by the failure determination device 80 according to the embodiment in a case where the pulse width modulation control is executed. FIG. 9 is a flowchart illustrating an example of processing which is executed by the failure determination device according to the embodiment in a case where the pulse width modulation control is executed.

In step S201, the data acquisition unit 81 acquires current target data indicating the target value of the current which is supplied to the rotating electrical machine 12.

In step S202, the data acquisition unit 81 acquires current data indicating the current which is supplied to the rotating electrical machine 12.

In step S203, the failure determination unit 83 calculates a difference between the target value of the current indicated by the current target data and the current indicated by the current data.

In step S204, the failure determination unit 83 determines whether the difference calculated in step S203 exceeds a predetermined threshold. In a case where the failure determination unit 83 determines that the difference calculated in step S203 exceeds the predetermined threshold (step S203: YES), the failure determination unit advances the process to step S205. On the other hand, in a case where the failure determination unit 83 determines that the difference calculated in step S203 is equal to or less than a predetermined threshold (step S203: NO), the failure determination unit advances the process to step S206.

In step S205, the failure determination unit 83 determines that at least one of the signal line connected to the switching element included in the inverter 38 and the conducting wire for supplying electric power to the rotating electrical machine 12 has failed.

In step S206, the failure determination unit 83 determines that the signal line connected to the switching element included in the inverter 38 and the conducting wire for supplying electric power to the rotating electrical machine 12 have not failed.

Hereinbefore, the failure determination device 80 according to the embodiment has been described. The failure determination device 80 includes the data acquisition unit 81, the calculation unit 82, and the failure determination unit 83. The data acquisition unit 81 acquires the rotation angle data, the voltage phase data, the angular velocity data, and the current data. The calculation unit 82 calculates the expectation value of the current which is supplied to the rotating electrical machine 12 using the rotation angle data, the voltage phase data, the angular velocity data, and the direct-current voltage data, and generates the current expectation value data indicating the expectation value. In a case where the inverter 38 is controlled by the one-pulse control, the failure determination unit 83 determines whether at least one of the signal line connected to the switching element included in the inverter 38 and the conducting wire for supplying electric power to the rotating electrical machine 12 has failed on the basis of the current expectation value data and the current data.

Thereby, even in a case where the inverter 38 is controlled by the one-pulse control and the current target data is not generated, the failure determination device 80 can determine whether at least one of the signal line connected to the switching element included in the inverter 38 and the conducting wire for supplying electric power to the rotating electrical machine has failed. Therefore, the failure determination device 80 does not reduce opportunities to execute such a determination.

In addition, in a case where the inverter 38 is controlled by the pulse width modulation control, the failure determination device 80 determines whether at least one of the signal line and the conducting wire has failed on the basis of the current target data and the current data.

Thereby, in a case where the inverter 38 is controlled by the pulse width modulation control and the current target data indicating the target value of the current which is supplied to the rotating electrical machine 12 is not generated, the failure determination device 80 can determine whether at least one of the signal line and the conducting wire described above has failed on the basis of the current target data and the current data.

Meanwhile, although a case where the rotating electrical machine 12 is mounted in the vehicle 1 has been described as an example in the above-described embodiment, there is no limitation thereto. The rotating electrical machine 12 can be mounted not only in the vehicle 1 but also in a moving object such as an airplane.

In addition, although a case where the failure determination unit 83 determines whether at least one of the signal line and the conducting wire described above has failed by determining whether the difference between the expectation value of the current at a predetermined time and the current at a predetermined time exceeds a predetermined threshold has been described as an example in the above-described embodiment, there is no limitation thereto.

The failure determination unit 83 may determine, for example, whether at least one of the signal line and the conducting wire described above has failed by determining whether a difference between the expectation value of the statistics of the current in a predetermined period and the statistics of the current in a predetermined period exceeds a predetermined threshold.

In addition, although a case where the failure determination unit 83 determines whether at least one of the signal line and the conducting wire described above has failed by determining whether the difference between the target value of the current at a predetermined time and the current at a predetermined time exceeds a predetermined threshold has been described as an example in the above-described embodiment, there is no limitation thereto.

The failure determination unit 83 may determine, for example, whether at least one of the signal line and the conducting wire described above has failed by determining whether the difference between the target value of the current in a predetermined period and the statistics of the current in a predetermined period exceeds a predetermined threshold.

Hereinbefore, the embodiment of the present invention has been described with reference to the accompanying drawings. However, the failure determination device, the failure determination program, and the failure determination method are not limited to the above-described embodiment, and at least one of modifications, substitutions, combinations, and design changes can be made without departing from the spirit or scope of the present invention.

In addition, the effect of the embodiment of the present invention described above is an effect described an example. Therefore, in addition to the above-described effect, the embodiment of the present invention can also exhibit other effects that can be recognized by those skilled in the art from the description of the above-described embodiment.

What is claimed is:

1. A failure determination device comprising:

a storage medium that stores a command capable of being read by a computer; and a processor connected to the storage medium, wherein the processor executes the command capable of being read by the computer, to thereby acquire, during execution of one-pulse control in which voltage phase control is adopted as a system for controlling an inverter that supplies electric power to a rotating electrical machine, rotation angle data indicating a rotation angle of a rotor included in the rotating electrical machine, voltage phase data indicating a phase of a voltage applied to the rotating electrical machine, angular velocity data indicating an angular velocity of the rotor, direct-current voltage data indicating a direct-current voltage supplied to the inverter, and current data indicating a current supplied to the rotating electrical machine, calculate an expectation value of the current supplied to the rotating electrical machine during the execution of one-pulse control using the rotation angle data, the voltage phase data, the angular velocity data, and the direct-current voltage data and generate current expectation value data indicating the expectation value, and based on the inverter being controlled by the one-pulse control and based on the current expectation value data and the current data, determine whether at least one of a signal line connected to a switching element included in the inverter and a conducting wire for supplying electric power to the rotating electrical machine has failed, wherein the processor determines that at least one of the signal line and the conducting wire has failed in a case where a difference between the expectation value of the current indicated by the current expectation value data and the current indicated by the current data exceeds a predetermined threshold, wherein the processor first calculates the voltage applied to the rotating electrical machine from the rotation angle data, the voltage phase data, and the direct-current voltage data, and then calculates the expectation value of the current supplied to the rotating electrical machine during execution of the one-pulse control from the calculated voltage applied to the rotating electrical machine, the angular velocity data, and expressions used for vector control of the rotating electrical machine, and wherein, when the inverter is controlled by pulse width modulation control, the processor does not calculate the expectation value of the current supplied to the rotating electrical machine and does not generate the current expectation value data indicating the expectation value.

2. The failure determination device according to claim 1, wherein the processor further acquires current target data indicating a target value of the current supplied to the rotating electrical machine, and in a case where the inverter is controlled by the pulse width modulation control, the processor determines whether at least one of the signal line and the conducting wire has failed on the basis of the current target data and the current data.

3. A computer readable non-transitory storage medium having a failure determination program stored therein, the program causing a computer to realize:

a data acquisition function of acquiring, during execution of one-pulse control in which voltage phase control is adopted as a system for controlling an inverter that supplies electric power to a rotating electrical machine, rotation angle data indicating a rotation angle of a rotor included in the rotating electrical machine, voltage phase data indicating a phase of a voltage applied to the rotating electrical machine, angular velocity data indicating an angular velocity of the rotor, direct-current voltage data indicating a direct-current voltage supplied to the inverter, and current data indicating a current supplied to the rotating electrical machine;

a current expectation value calculation function of calculating an expectation value of the current supplied to the rotating electrical machine during the execution of one-pulse control using the rotation angle data, the voltage phase data, the angular velocity data, and the direct-current voltage data and generating current expectation value data indicating the expectation value;

based on the inverter being controlled by the one-pulse control and based on the current expectation value data and the current data determining whether at least one of a signal line connected to a switching element included in the inverter and a conducting wire for supplying electric power to the rotating electrical machine has failed on the basis of the current expectation value data and the current data;

determining that at least one of the signal line and the conducting wire has failed in a case where a difference between the expectation value of the current indicated by the current expectation value data and the current indicated by the current data exceeds a predetermined threshold; and first calculating the voltage applied to the rotating electrical machine from the rotation angle data, the voltage phase data, and the direct-current voltage data, and then calculating the expectation value of the current supplied to the rotating electrical machine during execution of the one-pulse control from the calculated voltage applied to the rotating electrical machine, the angular velocity data, and expressions used for vector control of the rotating electrical machine, and wherein, when the inverter is controlled by pulse width modulation control, the processor does not calculate the expectation value of the current supplied to the rotating electrical machine and does not generate the current expectation value data indicating the expectation value.

4. The failure determination device according to claim 1, wherein the processor first calculates the voltage applied to the rotating electrical machine from the rotation angle data, the voltage phase data, and the direct-current voltage data, and then calculates the expectation value of the current supplied to the rotating electrical machine during execution of the one-pulse control from the calculated voltage applied to the rotating electrical machine, and the angular velocity data, by simultaneously solving the following expressions used for vector control of the rotating electrical machine,

[Expression 1]

$$v_d = ri_d - \omega L_q i_q \tag{1}$$

[Expression 2]

$$v_q = ri_q + \omega L_d i_d + \omega K_e \tag{2}$$

where $v_d$ represents the voltage applied to the rotating electrical machine in a d-axis direction, r represents an electrical resistance r of a winding of a stator included in the rotating electrical machine, $i_d$ represents the expectation value of the current in the d-axis direction, ω represents the angular velocity, $L_q$ represents a component of an inductance of the rotating electrical machine in a q-axis direction, $v_q$ represents the expectation value of the current in the q-axis direction, $v_q$ represents the voltage applied to the rotating electrical machine in the q-axis direction, $L_d$ represents a component of an inductance of the rotating electrical machine in the d-axis direction, and $K_e$ represents an amount of field magnetic flux of a permanent magnet forming the stator or a permanent magnet forming the rotor.

* * * * *